United States Patent Office 3,790,457
Patented Feb. 5, 1974

3,790,457
PROCESS FOR ADJUSTING THE ELECTRODE DISTANCE IN AN ELECTROLYTIC CELL WITH FLOWING MERCURY CATHODE
Gerhard Quietzsch, Frankfurt am Main, Bernd Greiner, Oberdorfelden, Helmut Hund, Schneidhain, Taunus, Harald Nottebohm, Frankfurt am Main, and Lothar Pelz, Oberroden, Germany, assignors to Farbwerke Hoechst Aktiengesellschaft vormals Meister Lucius & Bruning, Frankfurt am Main, Germany
Filed Dec. 18, 1972, Ser. No. 316,118
Claims priority, application Germany, Dec. 18, 1971,
P 21 62 962.9
Int. Cl. C01d 1/14; B23p 1/12
U.S. Cl. 204—99
1 Claim

ABSTRACT OF THE DISCLOSURE

The electrode distance in electrolysis cells with flowing mercury cathode is adjusted, for example in the alkali metal chloride electrolysis. The anodes or groups of anodes are brought close to the cathode until the ratio of the variation of the amplitude of the characteristic alternating voltage or current occurring with small electrode distances to the variation of the direct voltage or current in the electrolysis cell in the same time interval has reached a predetermined value.

---

The present invention relates to a process for adjusting the electrode distance in electrolytic cells with flowing mercury cathode for alkali metal chloride electrolysis.

British Pat. 1,167,001 describes a process for adjusting the electrode distance in an electrolytic cell with flowing mercury cathode for alkali metal chloride electrolysis which comprises bringing an anode or a group of anodes close to the cathode until the variations of the characteristic alternating current or voltage which occur with small electrode distances have attained a predetermined amplitude.

To adjust very small electrode distances, there are used according to this patent, variations of the characteristic alternating currents or voltages which are superimposed on the direct current of the cell and the amplitude of which increases as the electrode distance decreases. Each specific amplitude of the characteristic alternating voltage or current corresponds to a definite electrode distance. By control of a predetermined amplitude—that is to say a reference value to be used for the adjustment of the electrode—the desired electrode distance can be adjusted. In practice, it has been ascertained, however, that the amplitude depends not only on the electrode distance, but also on other parameters such as, for example, heterogeneity of the electrodes, variations in the cell bottom (curvatures), alterations of the mercury cathode (wave motion of the mercury band, destruction of the mercury band), and salt incrustations of the cell. When parameters different from anode to anode or from anode group to anode group, or from the total arrangement of anodes of one cell to another cell enter into the amplitude of the characteristic alternating voltage, all these anodes or anode groups have, with reference to a common value of amplitude, a different distance to the cathode with respect to one another. In order substantially to eliminate the influence of the "other" parameters for each anode or anode group, an individual value of the amplitude of the alternating voltage should be chosen with a definite distance to the cathode—i.e. as many values as correspond to the number of anodes or anode groups—and if necessary continuously adjusted during the operation of the cell.

Figure 1:
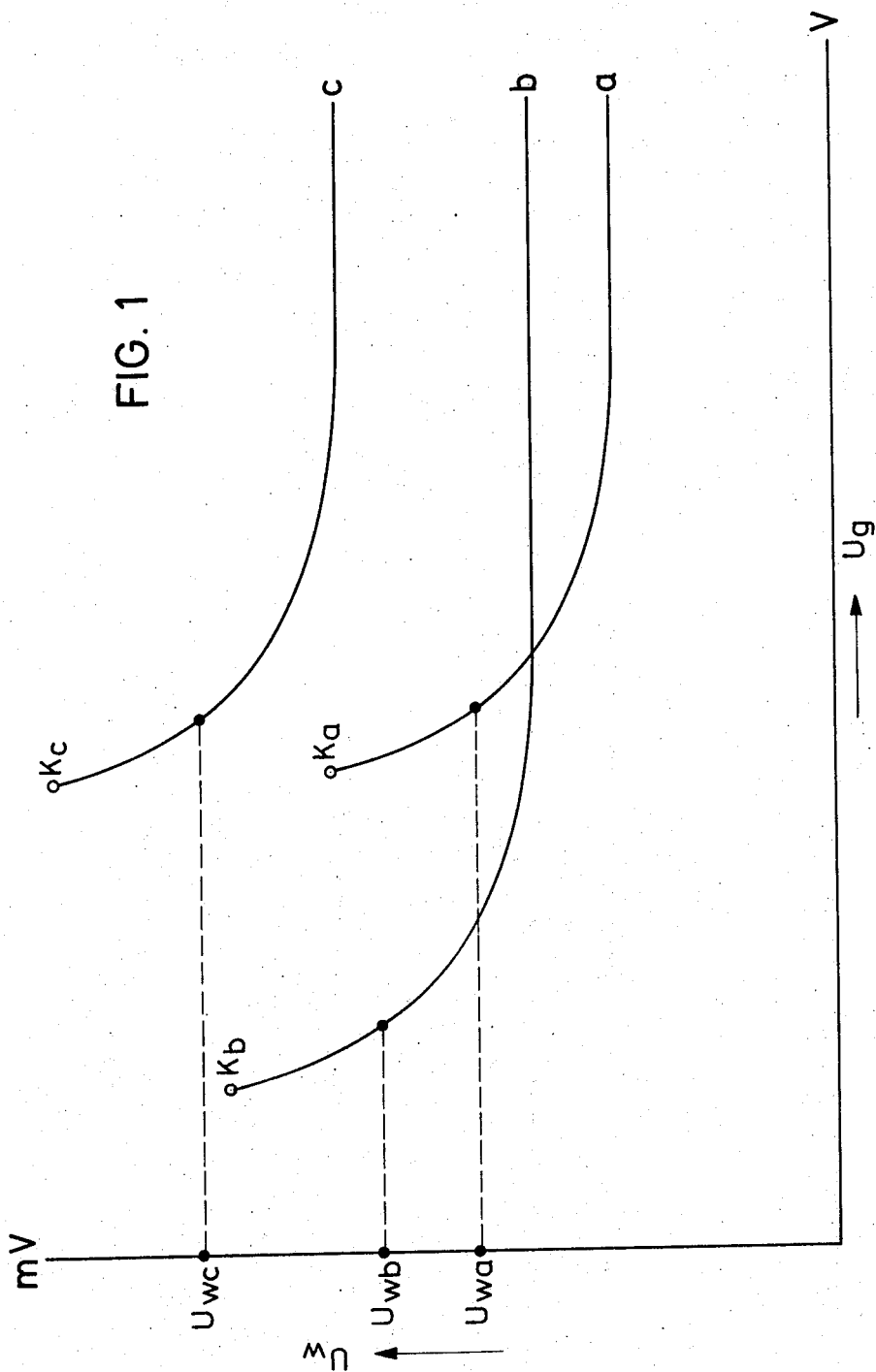

For the purpose of illustration, in FIG. 1 of the accompanying drawing the amplitudes of the alternating voltage $U_w$ are plotted by way of example as a function of the direct voltage $U_g$ of the cell between the total anode arrangement—practically the cell cover—and the mercury cathode for 3 different cells $a$, $b$ and $c$. It can be seen that with decreasing direct voltage of the cell—in the experiments the total anode arrangement was lowered—the alternating voltage increases. The points $K_a$, $K_b$ and $K_c$ indicate in all three curves the direct vicinity of short circuits. With a further diminution of the electrode distance the amplitude of the alternating voltage $U_w$ would further rise and cause immediately thereafter a short circuit.

It can also be seen that for each of the cells $a$, $b$, $c$ an individual value $U_{wa}$, $U_{wb}$, $U_{wc}$ should be determined if in all three cases the same distance from the danger of short circuit were maintained. The proposal to set a lower value for the direct cell voltage $U_g$ would not solve the problem either because of the points $K_a$, $K_b$ and $K_c$ being at different positions with respect to the direct cell voltage $U_g$.

Hence, it follows that the technical manipulation is complicated by an individual determination of a definite value $U_w$ for each cell and by the necessity of the continuous adjustment during the working time of each cell whereby the operation is encumbered with an instability risk. To reduce this instability risk it is necessary to determine the defined values $U_w$ to the safe side further than desirable. That means that for safety reasons in many cases a small distance of the electrodes with respect to one another cannot be adjusted. Hence, considerable amounts of energy are lost by increase of the electric resistances.

To avoid the aforesaid disadvantages in the process for adjusting the electrode distance in an electrolytic cell with flowing mercury cathode for the alkali metal chloride electrolysis by measuring the characteristic alternating voltage or current occuring with a small electrode distance, the present invention provides a process which comprises bringing an anode or a group of anodes close to the cathode until the ratio of the variation of the amplitude of the characteristic alternating voltage or current occurring with a small electrode distance to the variation measured in the same time interval of the direct cell voltage or current has reached a predetermined value.

Figure 2:
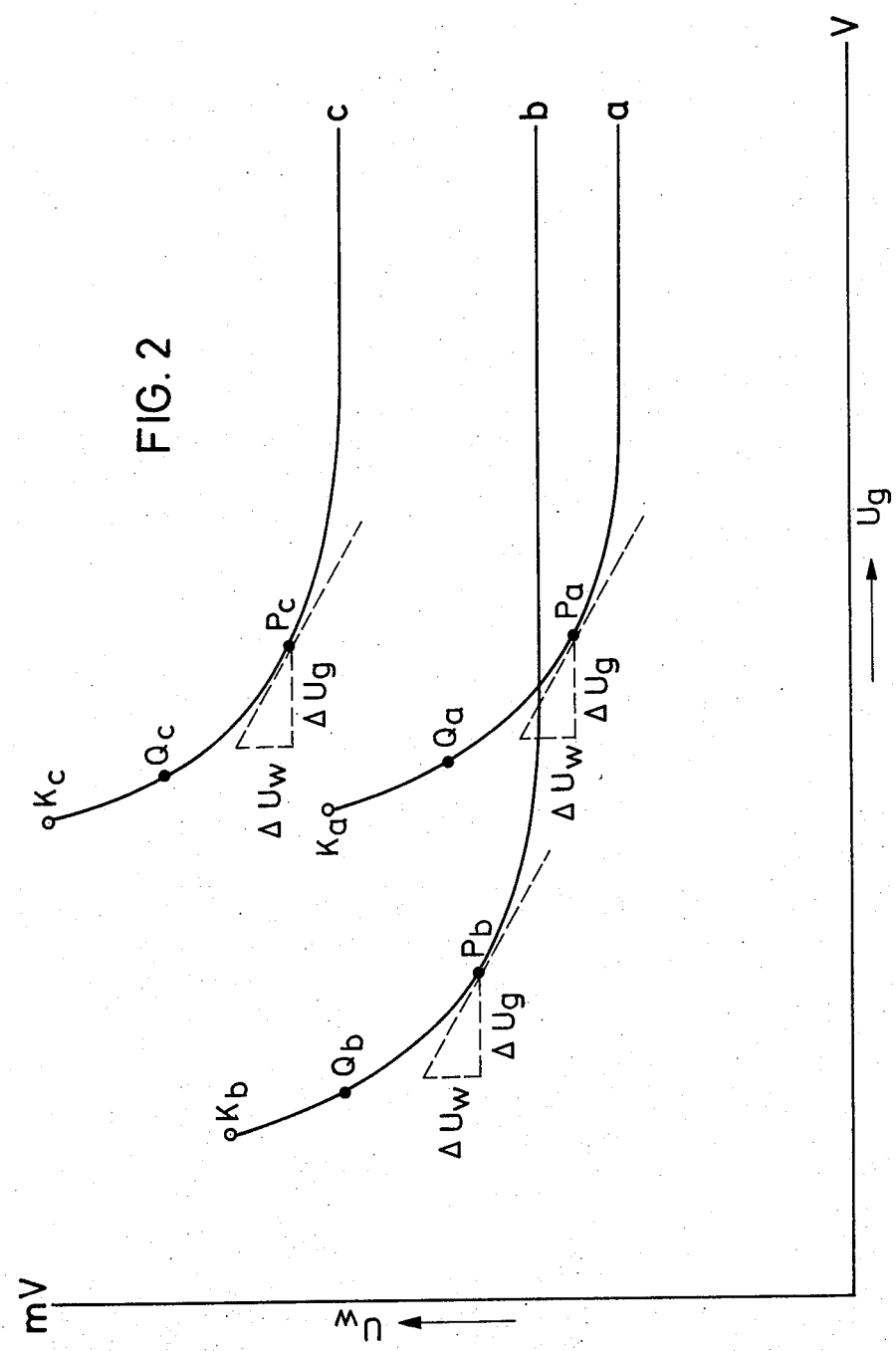

In the following, the electrolysis cell is named cell and the ratio of the variation of the amplitude of the characteristic alternating voltage or current occurring with small electrode distance to the variation measured in the same time interval of the direct cell voltage or current is defined as gradient. Thus, the gradient is the difference puotient $\Delta U_w/\Delta U_g$ or $\Delta I_w/\Delta I_g$ (FIG. 2).

One of the possible values of the gradient indicates the vicinity of the short circuit. This value can be fixed as limit. In the process of the invention, it is independent of the time of operation and the condition of the cell, i.e. independent of the different cell parameters.

The process of the invention will now be illustrated with reference to the accompanying drawing. In FIG. 2, the amplitudes of the alternating voltages $U_w$ are plotted as a function of the cell direct voltages $U_g$ between the total anode arrangement and the cathode for 3 different cells $a$, $b$ and $c$. Points $K_a$, $K_b$ and $K_c$ indicate the direct vicinity of short circuit. The gradient $\Delta U_w/\Delta U_g$ touches (tangentially) the three curves at points $P_a$, $P_b$ and $P_c$. With respect to the amplitude of the alternating voltage $U_w$, the points of contact $P_a$, $P_b$ and $P_c$ are at different values. In contradistinction to the different amplitudes $U_w$, the same value of the gradient means, however, an equal danger for a short circuit, that is to say that all points $P_a$, $P_b$ and $P_c$ have the same distance from the points $K_a$, $K_b$ and $K_c$. A suitably chosen gradient thus ensures a reference value for the adjustment of the electrodes which is independent of all cell parameters whereas in the process of the aforesaid British Patent, a number of predetermined values of the alternating voltage amplitude which corresponds at least to the number of cells must be available to adjust the electrodes with the same security (accuracy).

The fixation of the gradient can be freely chosen. In FIG. 2 the gradient could also be chosen for the points $Q_a$, $Q_b$, $Q_c$. The fixation depends on the means used for eliminating the danger of short circuit. With manual operation, the gradient should be fixed at a lower value than with automatic adjustment of the electrodes.

For carrying out the process of the invention, it is immaterial whether the variations of the alternating voltages are referred to the variations of the direct cell voltages or instead of the voltages the corresponding currents are used. There can be used the measured total alternating voltage or suitable characteristic frequency ranges, for example of from 2 to 30 cycles per second of the total alternating voltage.

On principle, the process of the invention can be used for adjusting anodes in electrolytic cells with flowing mercury cathode, especially for adjusting graphite and activated metal anodes.

Local danger which may involve a short circuit, for example by a single anode protruding from the total anode system, cannot be sharply determined by a measured value representative for the whole cell of the alternating voltage $U_w$ and direct voltage $U_g$. To predict a danger of short circuit in good time the alternating voltage $U_w$ and the direct voltage $U_g$ should be measured not at one point of the cell but at several points, for example three.

Figure 3:
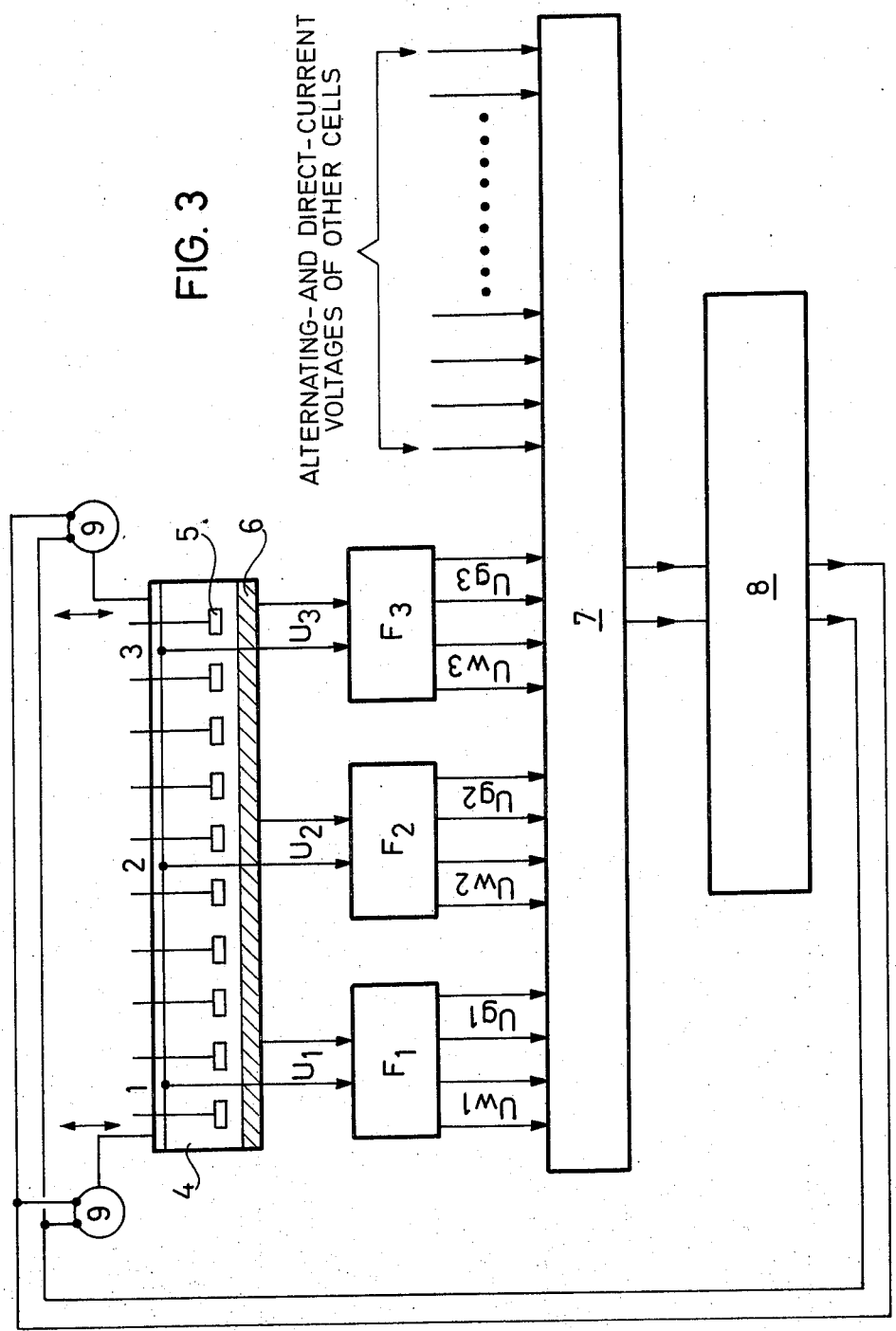

The process of the invention will now be described by way of example with reference to FIG. 3 of the accompanying drawings.

The total voltage $U_1$, $U_2$, $U_3$, i.e. direct cell voltage plus superimposed characteristic alternating voltage, is measured at 3 points (1, 2, 3) between anode 5 of a cell 6 represented in longitudinal section and being one of the numerous cells of a chlorine production plant. The measured voltages are conveyed to three active filters ($F_1$, $F_2$, $F_3$) at the outlet of which the direct voltages $U_{g1}$, $U_{g2}$, $U_{g3}$, free from alternating voltage and the rectified alternating voltages ($U_{w1}$, $U_{w2}$, $U_{w3}$) in the range of from 2 to 30 cycles per second are available. The lines for these voltages are connected to a rapid measuring commutator 7, switching each voltage output from the filters for each cell successively to the input of a process computer 8. The scanning rate of the scanner is chosen in such a manner that the individual voltages of all cells are collected by the computer at least within 2 seconds in each case.

For each pair of alternating voltage $U_w$ and direct voltage $U_g$ belonging to one another the computer establishes the gradient with respect to the preceding scanning period. By suitable programmed routines care is taken that faulty results owing to divisions by zero are avoided, that is to say when the direct cell voltage has not altered. The calculated gradients are compared with the pre-determined gradient. When after a scanning period this gradient is exceeded for 2 of the 3 measuring points (1, 2, 3) of a cell or when it is exceeded for one and the same measuring point in two successive scanning periods this event is considered by the computer as a warning and recorded. By this procedure accidental wrong measurements are substantially eliminated. Due to the warning, the computer actuates—via the line connecting the computer outlet with the connectors of motors 9 of the respective cell—the motors in such a manner that the total anode arrangement is lifted until the computer becomes aware that the releasing warning has disappeared. After a smoothing period the computer tries to move downward again the total anode arrangement in small chronological steps.

According to another embodiment of the present invention another mathematic function of the measuring data, alternating voltage $U_w$ and direct cell voltage $U_g$ is predetermined as characteristic value for the gradient signalling the danger of short circuit.

What is claimed is:

1. Process for adjusting the electrode distance in electrolytic cells with flowing mercury cathode for alkali metal chloride electrolysis by measuring the characteristic alternating voltages or currents occurring with small electrode distances, which comprises bringing an anode or a group of anodes close to the cathode until the ratio of the variation of the amplitude of the characteristic alternating voltage or current occurring with small electrode distances to the variation of the direct cell voltage or current measured in the same time interval has reached a predetermined value.

References Cited

UNITED STATES PATENTS

| | | | |
|---|---|---|---|
| 3,558,454 | 1/1971 | Schafer et al. | 204—99 |
| 3,689,398 | 9/1972 | Caleffi | 204—225 X |
| 3,723,285 | 3/1973 | Daga et al. | 204—228 |

FOREIGN PATENTS

| | | | |
|---|---|---|---|
| 1,167,001 | 10/1969 | Great Britain | 204—99 |
| 2,013,358 | 4/1970 | France | 204—225 |

JOHN H. MACK, Primary Examiner

D. R. VALENTINE, Assistant Examiner

U.S. Cl. X.R.

204—225